United States Patent
Chen et al.

(10) Patent No.: US 12,526,384 B2
(45) Date of Patent: Jan. 13, 2026

(54) METHOD, DEVICE, AND COMPUTER PROGRAM PRODUCT FOR VIDEO PROCESSING

(71) Applicant: Dell Products L.P., Round Rock, TX (US)

(72) Inventors: Qiang Chen, Shanghai (CN); Pedro Fernandez Orellana, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 476 days.

(21) Appl. No.: 18/112,831

(22) Filed: Feb. 22, 2023

(65) Prior Publication Data

US 2024/0236266 A1    Jul. 11, 2024

(30) Foreign Application Priority Data

Jan. 11, 2023   (CN) .......................... 202310041627.0

(51) Int. Cl.
*H04N 7/14*      (2006.01)
*H03M 7/30*      (2006.01)

(52) U.S. Cl.
CPC .............. *H04N 7/147* (2013.01); *H03M 7/30* (2013.01)

(58) Field of Classification Search
CPC .................................................. H04N 7/0117
See application file for complete search history.

(56) References Cited

U.S. PATENT DOCUMENTS

| | | | |
|---|---|---|---|
| 8,510,763 B2 | 8/2013 | Fatehpuria et al. | |
| 10,264,046 B2 | 4/2019 | Glynn | |
| 10,574,719 B2 | 2/2020 | O'Connell et al. | |
| 10,621,695 B2 | 4/2020 | Schroers et al. | |
| 10,701,394 B1 | 6/2020 | Caballero et al. | |

(Continued)

FOREIGN PATENT DOCUMENTS

GB       2600787 A  *  5/2022   ........... G06T 3/4046

OTHER PUBLICATIONS

Wikipedia, "Google Stadia," https://en.wikipedia.org/wiki/Google_Stadia, Aug. 11, 2021, 15 pages.

(Continued)

*Primary Examiner* — Amal S Zenati
(74) *Attorney, Agent, or Firm* — Ryan, Mason & Lewis, LLP (57) ABSTRACT

Embodiments of the present disclosure relate to a method, a device, and a computer program product for video processing. A method in one embodiment comprises receiving a first portion of a video stream from a sending device, wherein frames in the video stream comprise images of a user, and the first portion has a first resolution. The method further comprises acquiring a pre-trained model associated with the user from a set of candidate models, and generating a conversion model by adjusting the pre-trained model using the first portion. The conversion model is used to convert a second portion of the video stream into a reconstructed video stream, the second portion having a resolution lower than the first resolution and the reconstructed video stream having a resolution higher than a resolution. Such an embodiment can provide high-quality video in a privacy-preserving manner, for example, as part of a secure video service.

20 Claims, 4 Drawing Sheets

(56) References Cited

U.S. PATENT DOCUMENTS

| | | | |
|---|---|---|---|
| 2011/0307900 A1 | 12/2011 | Fatehpuria et al. | |
| 2013/0169863 A1 | 7/2013 | Smith et al. | |
| 2015/0163273 A1 | 6/2015 | Radcliffe et al. | |
| 2017/0302720 A1 | 10/2017 | Glynn | |
| 2018/0139458 A1* | 5/2018 | Wang | G06T 3/4053 |
| 2019/0130530 A1 | 5/2019 | Schroers et al. | |
| 2019/0158563 A1 | 5/2019 | O'Connell et al. | |
| 2020/0162789 A1* | 5/2020 | Ma | H04N 21/440263 |
| 2021/0006782 A1 | 1/2021 | Ramchandran et al. | |
| 2023/0024813 A1 | 1/2023 | Fernandez Orellana et al. | |
| 2023/0027981 A1 | 1/2023 | Chen et al. | |

OTHER PUBLICATIONS

Wikipedia, "Video Super Resolution," https://en.wikipedia.org/wiki/Video_Super_Resolution, Jun. 27, 2021, 18 pages.

Amazon Web Services, "AI Video Super Resolution," https://www.amazonaws.cn/en/solutions/ai-super-resolution-on-aws/, Feb. 2020, 6 pages.

Wikipedia, "GeForce Now," https://en.wikipedia.org/wiki/GeForce_Now, Jun. 6, 2021, 5 pages.

Wikipedia, "Xbox Cloud Gaming," https://en.wikipedia.org/wiki/Xbox_Cloud_Gaming, Aug. 9, 2021, 7 pages.

C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.

Wikipedia, "Nvidia Shield TV," https://en.wikipedia.org/wiki/Nvidia_Shield_TV, Jun. 24, 2021, 3 pages.

U.S. Appl. No. 17/520,908, filed in the name of Qiang Chen et al. on Nov. 8, 2021, and entitled "Method, System, and Computer Program Product for Streaming."

U.S. Appl. No. 17/572,203, filed in the name of Pedro Fernandez Orellana et al. on Jan. 10, 2022, and entitled "Method, Device, and Computer Program Product for Video Processing."

U.S. Appl. No. 17/665,649 filed in the name of Pedro Fernandez Orellana et al. on Feb. 7, 2022, and entitled "Computer-Implemented Method, Device, and Computer Program Product."

U.S. Appl. No. 17/672,369, filed in the name of Qiang Chen et al. on Feb. 15, 2022, and entitled "Method for Generating Metadata, Image Processing Method, Electronic Device, and Program Product."

U.S. Appl. No. 17/857,739, filed in the name of Qiang Chen et al. on Jul. 5, 2022, and entitled "Method, Electronic Device, and Computer Program Product for Video Processing."

U.S. Appl. No. 17/962,581, filed in the name of Qiang Chen et al. on Oct. 10, 2022, and entitled "Method, Electronic Device, and Computer Program Product for Video Processing."

* cited by examiner

METHOD, DEVICE, AND COMPUTER PROGRAM PRODUCT FOR VIDEO PROCESSING

RELATED APPLICATION

The present application claims priority to Chinese Patent Application No. 202310041627.0, filed Jan. 11, 2023, and entitled "Method, Device, and Computer Program Product for Video Processing," which is incorporated by reference herein in its entirety.

FIELD

Embodiments of the present disclosure relate to video technologies and, more specifically, to a method, a device, and a computer program product for video processing.

BACKGROUND

With the increasing popularity of telecommuting, videoconferencing has become an important means of communication for workers around the world. The massive growth in demand for videoconferencing services has put tremendous pressure on the underlying infrastructure of the services and has caused various problems. For example, video jamming due to connection jitter, etc., degrades user experience. To reduce traffic pressure, some video services reduce the resolution of a transmitted video stream during network jamming. However, this degrades the quality of the conferencing video viewed by a user and also has a negative impact on the user experience.

SUMMARY

Embodiments of the present disclosure provide a solution for video processing.

In a first aspect of the present disclosure, a method is provided, comprising: receiving a first portion of a video stream from a sending device, wherein frames in the video stream comprise images of a user, and the first portion has a first resolution; acquiring a pre-trained model associated with the user from a set of candidate models, wherein a candidate model in the set of candidate models is used to convert an input video into an output video having a higher resolution than that of the input video; and generating a conversion model by adjusting the pre-trained model using the first portion, wherein the conversion model is used to convert a second portion of the video stream into a reconstructed video stream, the second portion having a resolution lower than the first resolution and the reconstructed video stream having a resolution higher than the resolution of the second portion.

In a second aspect of the present disclosure, an electronic device is provided that includes a processor and a memory coupled to the processor, wherein the memory has instructions stored therein which, when executed by the processor, cause the electronic device to perform actions including: receiving a first portion of a video stream from a sending device, wherein frames in the video stream comprise images of a user, and the first portion has a first resolution; acquiring a pre-trained model associated with the user from a set of candidate models, wherein a candidate model in the set of candidate models is used to convert an input video into an output video having a higher resolution than that of the input video; and generating a conversion model by adjusting the pre-trained model using the first portion, wherein the conversion model is used to convert a second portion of the video stream into a reconstructed video stream, the second portion having a resolution lower than the first resolution and the reconstructed video stream having a resolution higher than the resolution of the second portion.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to execute the method according to the first aspect of the present disclosure.

It should be noted that this Summary is provided to introduce a selection of concepts in a simplified manner, which will be further described in the Detailed Description below. The Summary is neither intended to identify key features or major features of content of the present disclosure, nor intended to limit the scope of the content of the present disclosure.

BRIEF DESCRIPTION OF THE DRAWINGS

By further description of example embodiments of the present disclosure, provided in the Detailed Description below with reference to the accompanying drawings, the above and other objectives, features, and advantages of the present disclosure will become more apparent, in which.

Throughout all the drawings, the same or similar reference numerals represent the same or similar elements.

DETAILED DESCRIPTION

Illustrative embodiments of the present disclosure will be described in more detail below with reference to the accompanying drawings. Although the accompanying drawings illustrate certain embodiments of the present disclosure, it should be understood that the present disclosure can be implemented in various forms and should not be limited by the embodiments described herein. Instead, these embodiments are provided to enable a more thorough and complete understanding of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

With the increasing popularity of telecommuting, videoconferencing has become an important means of communication for workers around the world. The massive growth in demand for videoconferencing services has put tremendous pressure on the underlying infrastructure of the services, making it more difficult to consistently provide high-quality videoconferencing services.

On the one hand, due to the rapid expansion of the user base, massive video services have significantly increased the bandwidth pressure on a backbone network, thus leading to congestion in the data center of a service provider and/or the backbone network. On the other hand, customer-oriented Internet services are not optimized for video conferencing. The uplink bandwidth for a common user is typically much lower than the downlink bandwidth. For example, Internet broadband services of 300 Mb/s provided by operators typically provide users with downlink bandwidth of 300 Mb/s, but may only provide uplink bandwidth of 30 Mb/s. However, unlike services where users typically only receive videos, video conferencing also requires large uplink bandwidth to consistently transmit videos and screen sharing content, etc., from local attendees to other attendees. The limited uplink bandwidth of existing Internet services is relatively fragile and becomes a bottleneck in the quality of video conferencing services.

Deep learning such as deep neural networks (DNNs) can be used by videoconferencing services to address network challenges. For example, videoconferencing services in some embodiments can use a low-quality-up-high-quality-down (LQ-up-HQ-down) architecture. Due to the large amount of redundant visual information in a video conference, users can transmit only LQ local video. This LQ local video is then reconstructed into HQ video by a service provider using deep learning-based video super-resolution (VSR) models and streamed to other conference participants. The videoconferencing service may also distribute corresponding VSR models to clients of the conference participants for use in reconstructing the video streams locally on the clients.

The VSR model-based approach introduces potential security and privacy risks. These VSR models may contain sufficient information (e.g., facial features, etc.) for a particular user so as to reconstruct video for that user in the video conference. However, there is no guarantee that these models or user personal information included therein will not be used for other purposes, especially in the case where the VSR models can be received by conferencing clients of other users.

To at least partially address the above and other potential problems, embodiments of the present disclosure provide a solution for video processing. In a video conference supported by this solution, a video including a user will be streamed to other conference participants at a high resolution during a period of time (e.g., the first few minutes) at the beginning of the conference. This portion of video will be recorded for use in fine-tuning, specifically for the user, a pre-trained model associated with that user. This pre-trained model may be selected from a set of candidate models, wherein each candidate model is used to reconstruct the video into a video with a higher resolution. By means of fine-tuning, a conversion model is generated for the video stream, wherein the conversion model can convert subsequent portions of the video stream transmitted at a low resolution into a reconstructed video stream at a higher resolution. In some embodiments, candidate models may be trained on groups of persons with similar features, and a candidate model trained on a group of persons similar to the user is selected therefrom as the pre-trained model.

By means of a two-stage specialization of acquiring the pre-trained model and fine-tuning the pre-trained model during the conference, this solution can efficiently determine the conversion model for the video conference on the fly, thus allowing subsequent video streams to be transmitted and reconstructed at a low resolution. In this way, both model training and inference reconstruction for a video stream of a particular user occur within the infrastructure of a service provider, eliminating the need to pre-store a model including user personal features, thus avoiding the resulting risk of privacy leakage. In some embodiments, this solution destroys the conversion model immediately after a conference ends. In this way, the model containing the user's sensitive personal information only exists temporarily within the trusted environment during the video conference, thereby enhancing privacy preserving for the user.

The solution according to embodiments of the present disclosure adds a privacy-preserving mechanism on the basis of the deep learning-based video enhancement service (e.g., the videoconferencing service) while remaining transparent to a user, thus enabling the user to transmit a high-quality video in a privacy-preserving manner and with reduced bandwidth, thereby providing a secure infrastructure-as-a-service. Embodiments of the present disclosure will be described below in the context of video conferencing, but it should be understood that embodiments of the present disclosure are also applicable to other video streams that include images of persons.

Figure 1:
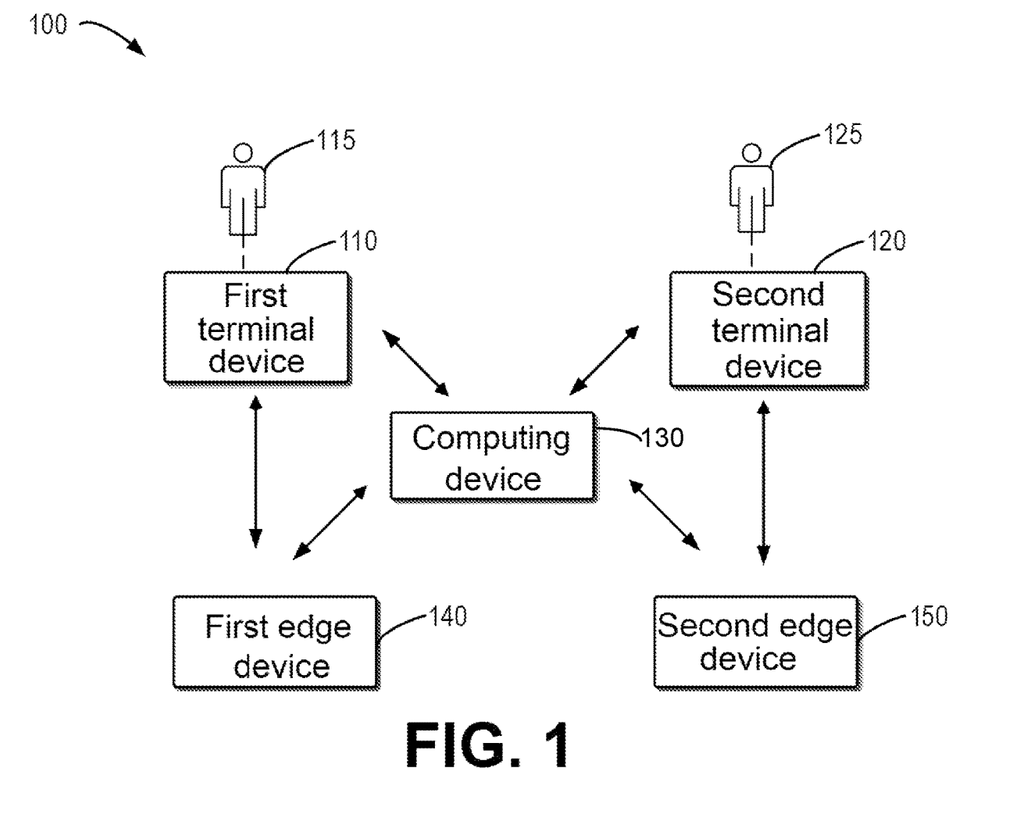
FIG. 1 illustrates a schematic diagram of an example environment in which a plurality of embodiments of the present disclosure can be implemented.

FIG. 1 illustrates a schematic diagram of example environment 100 in which multiple embodiments of the present disclosure can be implemented. As shown in FIG. 1, environment 100 includes first terminal device 110 and second terminal device 120 connected via a network. First terminal device 110 and second terminal device 120 may be devices with image acquisition apparatuses, for example, mobile phones, tablet computers, desktop computers, laptop computers, game consoles, and the like.

Environment 100 may also include computing device 130, which may be a core server or data center device of a service provider for a video transmission service (e.g., videoconferencing). It should be understood that, although illustrated as a single device, computing device 130 may also be implemented in any other form suitable for performing corresponding functions, such as a plurality of centralized devices, distributed devices, and/or cloud devices, etc.

Computing device 130 may provide video transmission services to first terminal device 110 and second terminal device 120. For example, user 115 using first terminal device 110 and user 125 using second terminal device 120 can initiate a video conference by enabling a related client application. As a result, a video captured by first terminal device 110 that includes images of the first user can be streamed to second terminal device 120, thus allowing user 125 to see user 115. Similarly, during the video conference, user 115 is able to see user 125. During the video conference, computing device 130 can, for example, use the method according to embodiments of the present disclosure to support the transmission of user video streams, as will be described in detail later.

It should be understood that environment 100 may include more terminal devices. In other words, the video transmission service supported by computing device 130 may provide video transmission services to more terminal devices simultaneously, and videos from one terminal device may be transmitted by computing device 130 to two or more terminal devices.

Environment 100 may also include a plurality of edge devices, such as first edge device 140 and second edge device 150. By way of example and not limitation, first edge device 140 is an edge device in the vicinity of first terminal device 110, and second edge device 150 is an edge device in the vicinity of second terminal device 120.

First edge device 140 and second edge device 150 may provide video processing capabilities. For example, the terminal devices may access video services via the edge devices. For example, first edge device 140 may reconstruct a low-resolution video stream from first terminal device 110 into a high-resolution video stream and send the high-resolution video stream to second terminal device 120 serving as the receiving device.

The architecture and functions in example environment 100 are described for illustrative purposes only, and do not imply any limitation to the scope of the present disclosure. There may also be other devices, systems, or components that are not shown in example environment 100. For example, example environment 100 may also include a plurality of routing devices. These routing devices may, for example, direct the forwarding of videos among a plurality of devices, and enable computing device 130 to distribute appropriate models to edge devices in the vicinity of corresponding terminals, and so on. Furthermore, embodiments of the present disclosure may also be applied to other environments having different structures and/or functions.

Computing device 130 may provide video transmission services to first terminal device 110 and second terminal device 120. For example, user 115 using first terminal device 110 and user 125 using second terminal device 120 can initiate a video conference by enabling a related client application. As a result, video captured by first terminal device 110 that includes images of the first user can be streamed to second terminal device 120, thus allowing user 125 to see user 115. Similarly, during the video conference, user 115 is able to see user 125. During the transmission of the video stream, computing device 130 may, for example, use the method according to embodiments of the present disclosure to support it, as will be described in detail later.

Figure 2:
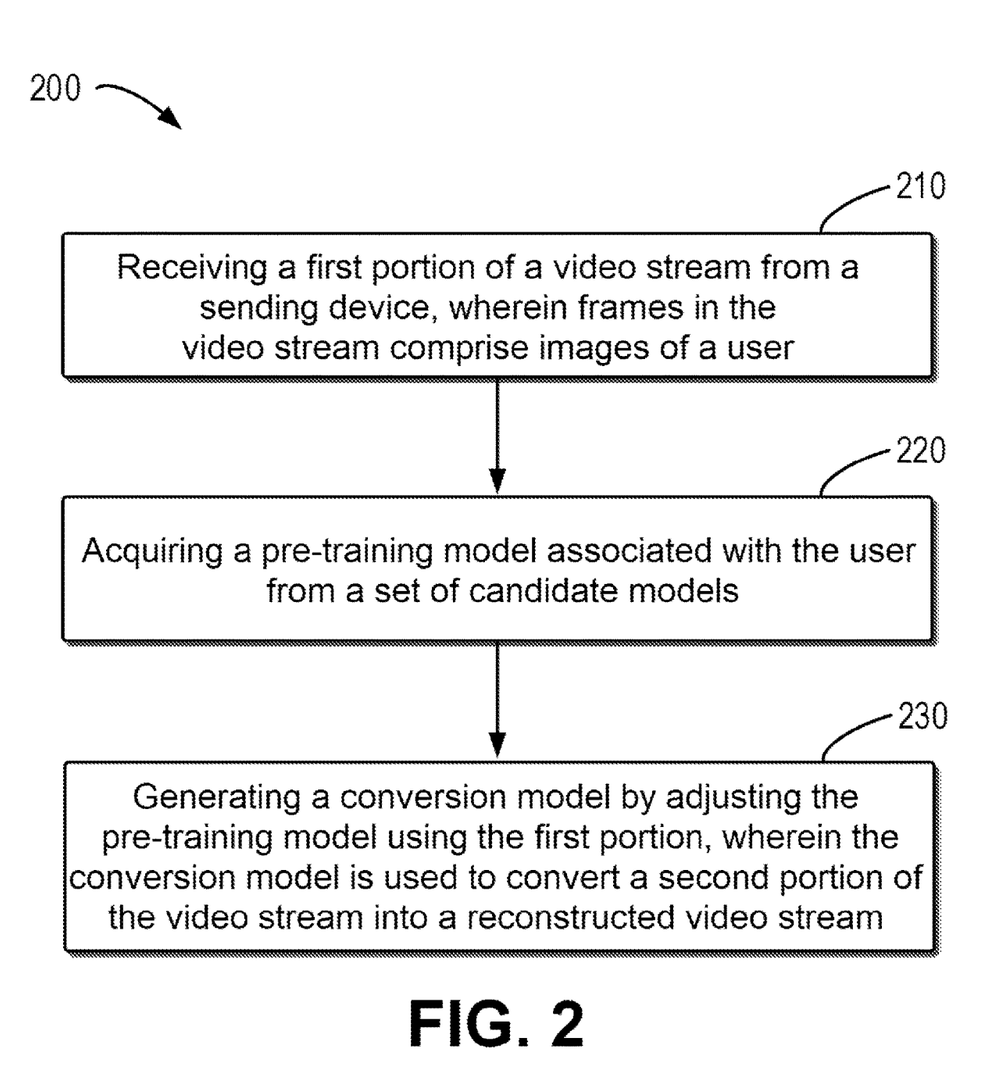
FIG. 2 illustrates a method for video processing according to some embodiments of the present disclosure.

FIG. 2 illustrates a flow chart of example method 200 for video processing according to some embodiments of the present disclosure. Example method 200 may be executed by computing device 130 shown in FIG. 1. It should be understood that method 200 may also include additional actions not shown, and the scope of the present disclosure is not limited in this regard. Method 200 is described in detail below in conjunction with example environment 100 of FIG. 1.

At block 210, a first portion of a video stream from a sending device is received, wherein frames in the video stream comprise images of a user, and the first portion has a first resolution. For example, computing device 130 may receive the first portion of a video stream from first terminal device 110, wherein the frames in this video stream comprise images of user 115 and have a first resolution.

For example, user 115 and user 125 may use client applications on first terminal device 110 and second terminal device 120 to initiate a video conference with each other. During the conference, the video including the images of user 115 is streamed to second terminal device 120. Here, the first portion of the video stream may be sent in a conventional manner (e.g., by means of forwarding via a routing device) to second terminal device 120 so as to be displayed to user 125. This first portion of the video stream is also sent to computing device 130 and recorded by computing device 130 for use.

In some embodiments, the first resolution may be the video that is expected to be received by the recipient of the video stream. For example, at the beginning stage (for example, within a few minutes) of the conference, first terminal device 110 may transmit the video stream of user 115 at a high resolution. In some embodiments, uploading the first portion to computing device 130 and sending it to second terminal device 120 can be performed on different paths, rather than necessarily forwarding the first portion to second terminal device 120 via computing device 130.

For illustration purposes, the description will be given in the context in which first terminal device 110 sends the video stream to second terminal device 120. However, it should be understood that during the conference, second terminal device 120 also sends a video stream including images of user 125 to first terminal device 110. In addition, a multi-person supported conference may also be initiated among more than two terminal devices, and each terminal device may send a video stream including the corresponding user to a plurality of other terminal devices, and receive video streams from a plurality of other terminal devices. These video streams can all be transmitted using the method according to embodiment of the present disclosure.

At block 220, a pre-trained model associated with the user is acquired from a set of candidate models, wherein a candidate model in the set of candidate models is used to convert an input video into an output video having a higher resolution than that of the input video. For example, computing device 130 may acquire the pre-trained model associated with user 115 from the set of candidate models. A candidate model in this set of candidate models is used to convert an input video into an output video having a higher resolution than that of the input video.

In some embodiments, each candidate model in the set of candidate models is trained on a group of persons having similar features. Compared with general video reconstruction models, the model trained in this way can achieve higher reconstruction quality when reconstructing a video including a person belonging to this group of persons. In addition, such a model is also more lightweight and thus easy to further fine-tune. The training of the candidate model will be described in more detail later with respect to FIGS. 4 and 5.

In some embodiments, computing device 130 may extract a set of features (such as facial features) of user 115 from the received first portion of the video stream, for example, in the form of feature vectors. Then, computing device 130 can select a model from the set of candidate models as the pre-trained model based on the similarity in the set of features between a corresponding group of persons targeted by a candidate model and user 115.

For example, computing device 130 may determine the centroid of the position in the feature space of the set of features of a plurality of persons in the group of persons, and take the distance between this centroid and the position of the set of features of user 115 in the feature space as the similarity. Computing device 130 may also determine the similarity in other appropriate ways (e.g., based on other types of centers). For example, computing device 130 may select a group of persons most similar to user 115. For example, computing device 130 may also add various constraints (for example, focusing on different weights, considering additional factors, and so on) on the basis of the consideration of similarity so as to select the model. The group of persons targeted by the selected pre-trained model is similar to the target person (for example, user 115), so the fine-tuning therefor can be completed in a short time so that it can be used in the subsequent portions of the video conference in time.

In some embodiments, computing device 130 may record, for example, an association between the model acquired based on the similarity and user 115, for example, in its user database. In this way, when user 115 initiates a video conference again, computing device 130 can directly acquire the corresponding candidate model as the pre-trained model according to the recorded association.

At block 230, a conversion model is generated by adjusting the pre-trained model using the first portion, wherein the conversion model is used to convert a second portion of the video stream into a reconstructed video stream. The second portion has a resolution lower than the first resolution, and the reconstructed video stream has a resolution higher than the resolution of the second portion. For example, by adjusting the pre-trained model acquired at block 220 using the first portion received at block 210, computing device 130 can generate the conversion model that is used to convert the second portion of the video stream into the reconstructed video stream.

In some embodiments, computing device 130 may use the first portion of a predetermined length of time (for example, a few minutes) to adjust the pre-trained model. In some other embodiments, computing device 130 may use the received portion of the video stream to adjust the pre-trained model until it meets a certain quality standard or the length of time of the portion reaches a threshold.

In some embodiments, computing device 130 may acquire a compressed video of the first portion, the compressed video having a resolution lower than the first resolution. For example, computing device 130 may compress the first portion to acquire the compressed video. For example, first terminal device 110 may compress the first portion and send it to computing device 130. Computing device 130 may use the first portion and the compressed video as training data to train the selected pre-trained model to generate the conversion model. For example, computing device 130 may further train the pre-trained model by taking corresponding frames of the first portion and the compressed video as sample pairs of high-resolution video and low-resolution video, respectively. The pre-trained model may, for example, be a machine learning model such as a deep neural network model, the specific form of which depends on the implementation, and embodiments of the present disclosure are not limited thereto.

With method 200, the backend of the video service provider can record some of the clips of a video conference with the user's consent and use them to fine-tune an appropriate pre-trained model. In this way, the video service provider is able to create, on demand and on the fly, a model specific to each party in the video conference for use in the reconstruction of subsequent portions of that video conference, without the need to pre-store models that include user personal features.

After the conversion model for the video stream of user 115 is determined during the video conference (e.g., according to method 200), first terminal device 110 can transmit a subsequent second portion of the conference at another resolution lower than the first resolution. The backend of the video service may then reconstruct the second portion into a video stream with a resolution higher than that another resolution (e.g., the first resolution, or some resolution such as that which depends on the display capabilities of the recipient) and send the reconstructed video stream to the video recipient. In some embodiments, the resolution of the second portion and the resolution of the reconstructed video stream may vary due to changes in conditions such as real-time bandwidth and available computing resources. For example, the resolution at which the second portion is sent may be increased when bandwidth resources are abundant. For example, the resolution of the reconstructed video stream may change in response to user 125 changing the resolution setting during the conference.

In some embodiments, computing device 130 (e.g., a server acting as a core data center) may use the conversion model to convert the second portion of the video stream that includes user 115 into a reconstructed video stream. Then, either directly or by forwarding via a routing device, computing device 130 may send the reconstructed video stream to second terminal device 120 serving as the receiving device. In this way, first terminal device 110 can send a low-resolution conference video stream while user 125 of the second terminal device can still view the reconstructed high-quality video.

In some embodiments, the reconstruction of the video stream may also occur at a regional or edge data center closer to the recipient of the video, so that bandwidth can be further reduced. In such embodiments, computing device 130 may selectively send the conversion model to the regional data center or edge data center, thus enabling it to reconstruct the video stream and send it to the terminal of the recipient.

In some such embodiments, computing device 130 may (for example, by means of addressing via the routing device) determine an edge device in the vicinity of the receiving device of the video stream, and send the conversion model to the edge device. For example, computing device 130 may determine second edge device 150 in the vicinity of second terminal device 120 serving as the receiving device and send the conversion model for the video stream for user 115 of first terminal device 110 to second edge device 150.

In some embodiments, in response to determining that the conversion model is sent to the edge device, computing device 130 may send an indication (e.g., an indication that the conversion model is ready) to first terminal device 110 serving as the video sending device, wherein the indication is used to enable the sending device to reduce the resolution of the sent video stream. In this way, first terminal device 110 can be informed that it can begin transmitting the video stream at a low resolution and that the video stream being transmitted can be reconstructed. In some other embodiments, the resolution at which the video stream is actually sent may also be determined automatically based on, for example, real-time bandwidth, and the video reconstruction is performed on demand after the conversion model is determined.

Although method 200 has been described above with respect to computing device 130, in some embodiments, the determination of the conversion model may also be performed at a device of the regional data center or at an edge device. For example, second edge device 150 in the vicinity of second terminal device 120 may store a set of candidate models and generate a conversion model based on a first portion of the video stream from first terminal device 110 after the video conference begins (e.g., using method 200). During generation of the conversion model, second edge device 150 may send that first portion of the video stream to second terminal device 120 serving as the receiving device. After the conversion model is generated, second edge device 150 may use the conversion model to reconstruct subsequent portions of the video stream from first terminal device 110.

In some such embodiments, after the conversion model has been generated, second edge device 150 may also send, to first terminal device 110 serving as the video sending device, an indication for causing the sending device to reduce the resolution of the sent video stream. In addition, in some embodiments, for example, in a multi-person video conference, second edge device 150 may also distribute the conversion model to edge devices in the vicinity of other recipients and send an indication to the conversion model after the conversion model has been distributed.

Similarly, in some embodiments, a device in a certain regional data center within the video service architecture may also determine and distribute the conversion model and send an indication that the conversion model is ready, etc., in accordance with embodiments of the present disclosure.

In some embodiments, in response to ending of transmission of the video stream, the conversion model generated during the video conference for the conference participant may be destroyed. For example, computing device 130 and one or more edge devices may each destroy, at the end of the video conference, the conversion models stored thereon that are determined for the conference streams for the conference participants. For example, computing device 130 may instruct the destruction of all copies of the conversion models determined during the video conference within the conferencing service architecture. In some embodiments, computing device 130 may also cause the stored data related to the video stream (e.g., the first portion that is used to fine-tune the model) to be destroyed, for example, after the conversion model is determined or at the end of transmission of the video stream.

Figure 3:
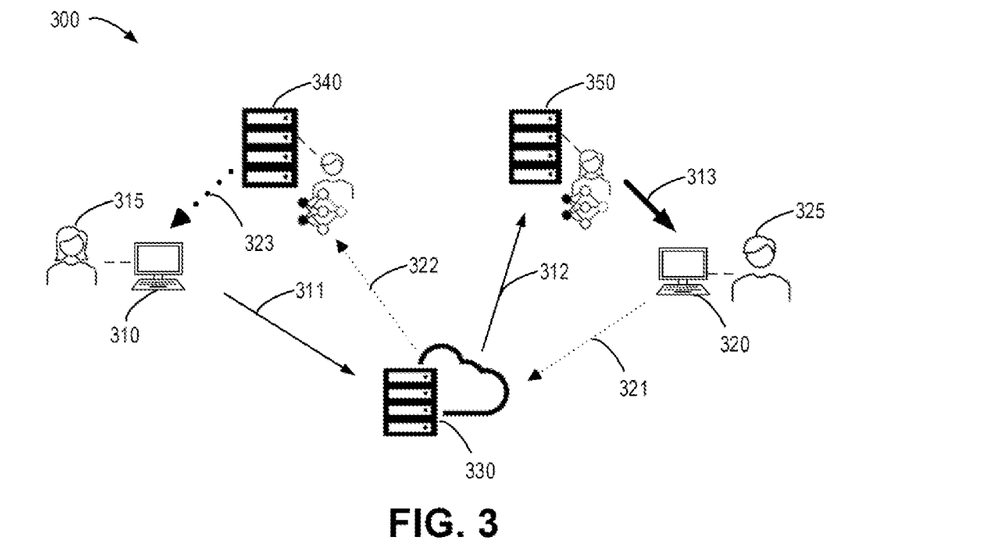
FIG. 3 illustrates a schematic diagram of an example of the transmission of a video stream according to some embodiments of the present disclosure.

FIG. 3 illustrates a schematic diagram of example 300 of the transmission of a video stream according to some embodiments of the present disclosure. In example 300, terminal device 310 and terminal device 320 are used by user 315 and user 325, respectively, for video conferencing with each other. In addition, the conversion model determined for user 315 according to some embodiments of the present disclosure (e.g., using method 200) has been sent to edge device 350 in the vicinity of terminal device 320, and the conversion model for user 325 has been sent to edge device 340 in the vicinity of terminal device 310. The generation and conversion of the conversion model are completed at the beginning stage (e.g., within a few minutes) of the video conference.

At this point, terminal device 310 may send a video stream of user 315 to core facility 330 (e.g., including a central server, routing devices, and so on) of the video service at a low resolution, as shown by arrow 311. After this video stream is forwarded to edge device 350 via core facility 330 as shown by arrow 312, edge device 350 reconstructs it into a higher resolution video stream using the model for user 315 and sends the reconstructed video stream to terminal device 320 as shown by arrow 313. Similarly, the video of user 325 is also uploaded by terminal device 320 at a low resolution and is sent to terminal device 310 after being reconstructed at edge device 340, as shown by dashed arrows 321, 322, and 323. Throughout the conference, the users still watch each other's videos just as they would in a regular video conference. After the conference ends, the conferencing service facility can destroy each copy of the conversion model generated during the conference.

In this way, throughout the video conference, conversion model training and video stream reconstruction inference for an individual user occur within the video service infrastructure and are transparent to the end user. For each user, the terminal device thereof still uploads and downloads videos, and for a period of time after the conference starts, the terminal device only requires very little uplink bandwidth to maintain a stable and smooth clear video conference experience for conference participants. No client devices will upload or download models that include user personal features, and models within the service infrastructure exist only for the duration of the conference and are not sent outside the conference service facility, thus avoiding the risk of leakage of relevant privacy data.

Figure 4:
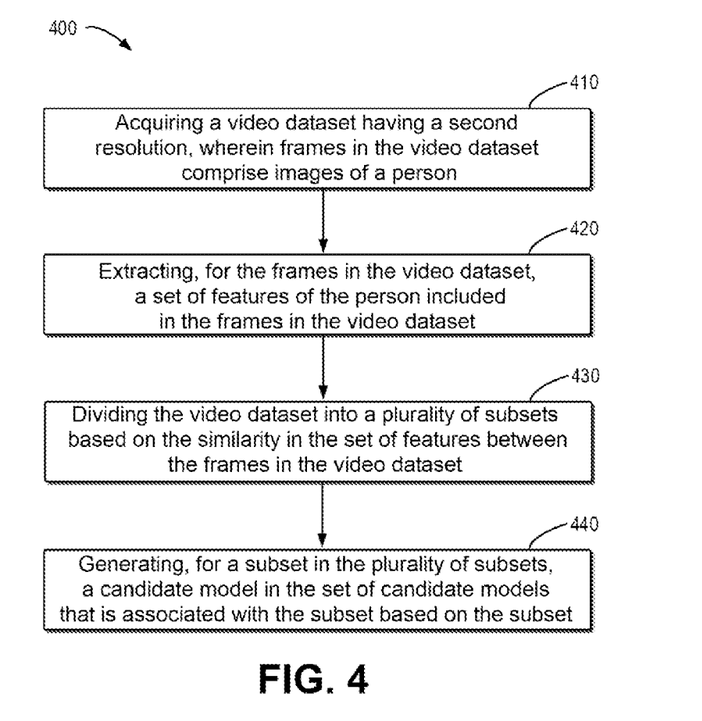
FIG. 4 illustrates a method for generating a set of candidate models according to some embodiments of the present disclosure.

In some embodiments, computing device 130 may prepare (e.g., pre-train) a set of candidate models for use in reconstructing videos for various types of persons. FIG. 4 illustrates a flow chart of example method 400 for generating a set of candidate models according to some embodiments of the present disclosure. Example method 400 may be performed, for example, by computing device 130 as shown in FIG. 1, and the determined set of candidate models may be used in, for example, method 200. It should be understood that method 400 may also include additional actions not shown, and the scope of the present disclosure is not limited in this regard. Method 400 is described in detail below in conjunction with example environment 100 of FIG. 1.

At block 410, computing device 130 may acquire a video dataset having a second resolution, wherein frames in the video dataset comprise images of a person. For example, computing device 130 may collect a large dataset of facial features covering the majority of the user population of the video service. For example, the dataset may be from proprietary data, open source data, or a combination of both. In some embodiments, computing device 130 may acquire video data having different resolutions and convert such data into data with a uniform second resolution.

At block 420, computing device 130 may extract, for the frames in the video dataset, a set of features of the person included in the frames in the video dataset. For example, computing device 130 may use a convolutional neural network model such as ResNet to extract a set of feature vectors of the face of the person in the video frames, such as features about the face shape and facial features, etc. In some embodiments, computing device 130 may extract a set of features of the person for the video frames. In some embodiments, computing device 130 may extract the set of features of the person for video clips that include the same person. Computing device 130 may also extract features in other appropriate sample units.

At block 430, computing device 130 may divide the video dataset into a plurality of subsets based on the similarity in the set of features between the frames in the video dataset. For example, computing device 130 may cluster in feature space the feature vectors extracted at block 420 so that the frames or clips corresponding to those feature vectors are divided into a plurality of clusters. Computing device 130 may then treat each cluster of video data as a subset.

Figure 5:
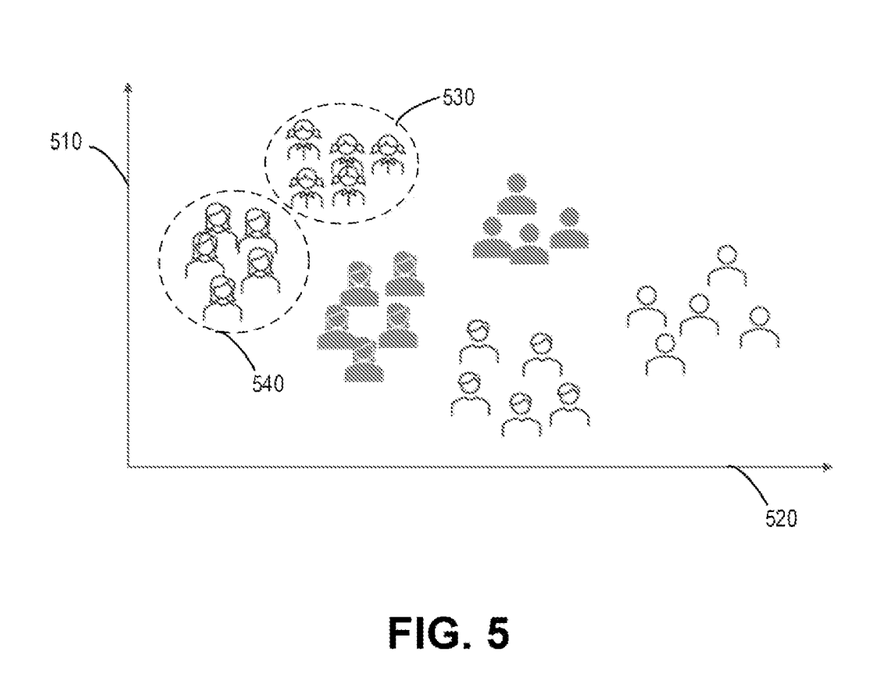
FIG. 5 illustrates a simplified example visualization of the clustering, in feature space, of persons in video data.

Clustering based on features of persons illustratively enables data in the video dataset that includes similar persons to be classified into the same subset. In some embodiments, computing device 130 may also adjust the clusters according to a received manual adjustment input, so as to minimize the potential bias, thus making the clustering results more accurate. FIG. 5 illustrates simplified example visualization 500 of the clustering, in feature space, of persons in video data.

For illustration purposes, the feature space representation in FIG. 5 is projected onto a two-dimensional feature plane, as indicated by the planes identified by coordinate axis 510 and coordinate axis 520. By means of clustering, video data including similar persons can be divided into one cluster. For example, persons included in data in cluster 530 typically have round faces and braided hairstyles, while persons included in data in cluster 540 typically have round faces and shawl hairstyles.

It should be understood that simplified example visualization 500 of the clustering is used only for the purpose of aiding understanding, where the schematic diagram of clustering is shown only to distinguish between different clusters and does not correspond to actually achieved clustering results. In various embodiments, the number of features (i.e., the dimensionality of the feature space) on which the clustering is based may be much larger, for example, tens, hundreds, or more. In addition, the numbers and types of the divided clusters, the amount of data included in each cluster, etc., can vary in different embodiments based on a variety of factors such as the size and diversity of the dataset and the needs of implementations.

Now, reference continues to be made to FIG. 4. At block 440, computing device 130 may generate, for a subset in the plurality of subsets, a candidate model in the set of candidate models that is associated with the subset based on the subset. In other words, computing device 130 may generate a candidate model based on each subset and use the set of candidate models acquired in this way as the set of candidate models.

In some embodiments, computing device 130 may convert the frames in the subset to frames having a third resolution, the third resolution being lower than the original second resolution of the frames in the subset. Computing device 130 may then generate the candidate models associated with this subset using the frames in the subset and the converted frames having the third resolution as training data. For example, computing device 130 may use the frames in the subset and the corresponding frames that have been converted as sample pairs of high-resolution video and low-resolution video, respectively, to train a candidate model based on a machine learning algorithm. The specific form of this candidate model may depend on an implementation.

Using method 400, a set of VSR models may be acquired that each targets a group of similar persons, where each VSR model may be used to reconstruct videos including persons in the corresponding group of persons. These models provide the basis for efficient on-the-fly generation of VSR models for specific persons in the video during the transmission of the video. In conjunction with, for example, method 200, some embodiments of the present disclosure can provide a pre-training and fine-tuning framework for video reconstruction that allows VSR models for specific users to exist only during the transmission of video, thereby avoiding privacy leakage due to the need to store and distribute models that include user personal features.

Figure 6:
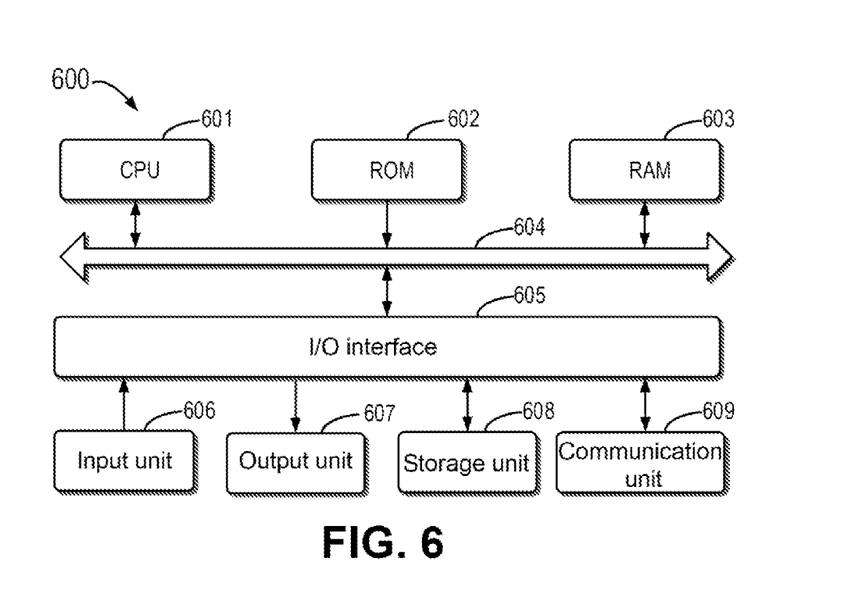
FIG. 6 illustrates a schematic block diagram of a device that may be used to implement embodiments of the present disclosure.

FIG. 6 illustrates a schematic block diagram of device 600 that may be used to implement embodiments of the present disclosure. Device 600 may be the device or apparatus described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604. Although not shown in FIG. 6, device 600 may also include a coprocessor.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by CPU 601. For example, in some embodiments, the methods or processes can be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded onto RAM 603 and executed by CPU 601, one or more steps or actions of the methods or processes described above may be performed.

In some embodiments, the methods or processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method, comprising:
receiving a first portion of a video stream from a sending device, wherein frames in the video stream comprise images of a first user, and the first portion has a first resolution;
acquiring, based on features of the first user extracted from the first portion of the video stream, a pre-trained model associated with the first user from a set of candidate models, wherein a candidate model in the set of candidate models is used to convert an input video into an output video having a higher resolution than that of the input video, the pre-trained model being a particular one of the candidate models that is selected based on similarity between (i) the features of the first user as extracted from the first portion of the video stream and (ii) features of additional users as extracted from one or more additional video streams used to train the candidate models; and
generating a conversion model specifically adapted to the first user by adjusting the pre-trained model using the first portion, wherein the conversion model is used to convert a second portion of the video stream into a reconstructed video stream, the second portion having a resolution lower than the first resolution and the reconstructed video stream having a resolution higher than the resolution of the second portion.

2. The method according to claim 1, wherein a candidate model in the set of candidate models is trained on a group of persons having a set of similar features, and acquiring the pre-trained model associated with the first user comprises:
extracting the set of features of the first user from the first portion; and
selecting the pre-trained model from the set of candidate models based on a similarity in the set of features between a corresponding group of persons targeted by a candidate model in the set of candidate models and the first user.

3. The method according to claim 1, wherein generating the conversion model comprises:
acquiring a compressed video for the first portion, the compressed video having a resolution lower than the first resolution; and training the pre-trained model by using the first portion and the compressed video as training data to generate the conversion model.

4. The method according to claim 1, further comprising:
converting the second portion into the reconstructed video stream using the conversion model; and
sending the reconstructed video stream to a receiving device.

5. The method according to claim 1, wherein at least one of the resolution of the second portion and the resolution of the reconstructed video stream varies with time.

6. The method according to claim 1, further comprising:
determining an edge device in the vicinity of a receiving device for the video stream; and
sending the conversion model to the edge device.

7. The method according to claim 1, further comprising:
destroying the conversion model in response to ending of transmission of the video stream.

8. The method according to claim 1, further comprising:
acquiring a video dataset having a second resolution, wherein frames in the video dataset comprise images of a person;
extracting, for the frames in the video dataset, a set of features of the person included in the frames in the video dataset;
dividing the video dataset into a plurality of subsets based on a similarity in the set of features between the frames in the video dataset; and
generating, for a subset in the plurality of subsets, a candidate model in the set of candidate models that is associated with the subset based on the subset.

9. The method according to claim 8, wherein generating the candidate model associated with the subset comprises:
converting frames in the subset to frames having a third resolution, the third resolution being lower than the second resolution; and
generating the candidate model associated with the subset using the frames in the subset and the converted frames having the third resolution as training data.

10. An electronic device, comprising:
at least one processor; and
memory coupled to the at least one processor, wherein the memory has instructions stored therein which, when executed by the at least one processor, cause the electronic device to perform actions comprising:
receiving a first portion of a video stream from a sending device, wherein frames in the video stream comprise images of a first user, and the first portion has a first resolution;
acquiring, based on features of the first user extracted from the first portion of the video stream, a pre-trained model associated with the first user from a set of candidate models, wherein a candidate model in the set of candidate models is used to convert an input video into an output video having a higher resolution than that of the input video, the pre-trained model being a particular one of the candidate models that is selected based on similarity between (i) the features of the first user as extracted from the first portion of the video stream and (ii) features of additional users as extracted from one or more additional video streams used to train the candidate models; and
generating a conversion model specifically adapted to the first user by adjusting the pre-trained model using the first portion, wherein the conversion model is used to convert a second portion of the video stream into a reconstructed video stream, the second portion having a resolution lower than the first resolution and the reconstructed video stream having a resolution higher than the resolution of the second portion.

11. The electronic device according to claim 10, wherein a candidate model in the set of candidate models is trained on a group of persons having a set of similar features, and acquiring the pre-trained model associated with the first user comprises:
extracting the set of features of the first user from the first portion; and
selecting the pre-trained model from the set of candidate models based on a similarity in the set of features between a corresponding group of persons targeted by a candidate model in the set of candidate models and the first user.

12. The electronic device according to claim 10, wherein generating the conversion model comprises:
acquiring a compressed video for the first portion, the compressed video having a resolution lower than the first resolution; and
training the pre-trained model by using the first portion and the compressed video as training data to generate the conversion model.

13. The electronic device according to claim 10, wherein the actions further comprise:
converting the second portion into the reconstructed video stream using the conversion model; and
sending the reconstructed video stream to a receiving device.

14. The electronic device according to claim 10, wherein at least one of the resolution of the second portion and the resolution of the reconstructed video stream varies with time.

15. The electronic device according to claim 10, wherein the actions further comprise:
determining an edge device in the vicinity of a receiving device for the video stream; and
sending the conversion model to the edge device.

16. The electronic device according to claim 10, wherein the actions further comprise:
destroying the conversion model in response to ending of transmission of the video stream.

17. The electronic device according to claim 10, wherein the actions further comprise:
acquiring a video dataset having a second resolution, wherein frames in the video dataset comprise images of a person;
extracting, for the frames in the video dataset, a set of features of the person included in the frames in the video dataset;
dividing the video dataset into a plurality of subsets based on a similarity in the set of features between the frames in the video dataset; and
generating, for a subset in the plurality of subsets, a candidate model in the set of candidate models that is associated with the subset based on the subset.

18. The electronic device according to claim 17, wherein generating the candidate model associated with the subset comprises:
converting frames in the subset to frames having a third resolution, the third resolution being lower than the second resolution; and
generating the candidate model associated with the subset using the frames in the subset and the converted frames having the third resolution as training data.

19. A computer program product comprising a non-transitory computer-readable medium having machine-executable instructions stored therein, wherein the machine-executable instructions, when executed by a machine, cause the machine to perform actions comprising:

receiving a first portion of a video stream from a sending device, wherein frames in the video stream comprise images of a first user, and the first portion has a first resolution;

acquiring, based on features of the first user extracted from the first portion of the video stream, a pre-trained model associated with the first user from a set of candidate models, wherein a candidate model in the set of candidate models is used to convert an input video into an output video having a higher resolution than that of the input video, the pre-trained model being a particular one of the candidate models that is selected based on similarity between (i) the features of the first user as extracted from the first portion of the video stream and (ii) features of additional users as extracted from one or more additional video streams used to train the candidate models; and generating a conversion model specifically adapted to the first user by adjusting the pre-trained model using the first portion, wherein the conversion model is used to convert a second portion of the video stream into a reconstructed video stream, the second portion having a resolution lower than the first resolution and the reconstructed video stream having a resolution higher than the resolution of the second portion.

20. The computer program product according to claim 19, wherein a candidate model in the set of candidate models is trained on a group of persons having a set of similar features, and acquiring the pre-trained model associated with the first user comprises:

extracting the set of features of the first user from the first portion; and selecting the pre-trained model from the set of candidate models based on a similarity in the set of features between a corresponding group of persons targeted by a candidate model in the set of candidate models and the first user.

* * * * *